March 3, 1936. C. F. RAUEN Re. 19,882

AUTOMATIC BRAKE FOR POWER TRANSMISSION SYSTEMS

Original Filed May 29, 1923

INVENTOR.

Carl F. Rauen

Reissued Mar. 3, 1936 Re. 19,882

UNITED STATES PATENT OFFICE 19,882

AUTOMATIC BRAKE FOR POWER TRANSMISSION SYSTEMS

Carl F. Rauen, Grosse Pointe, Mich.

Original No. 1,496,740, dated June 3, 1924, Serial No. 642,302, May 29, 1923. Application for reissue April 1, 1932, Serial No. 602,609

49 Claims. (Cl. 192—4)

This invention relates to an automatic brake for power transmission systems of motor vehicles and the like.

An object of the invention is to provide means for automatically preventing undesired reverse movement of a vehicle.

Another object is to provide means for automatically rendering the above means inoperative when reverse movement of the vehicle is desired.

A further object is to provide means for maintaining the first means inoperative until the transmission is set for a forward speed, or torque from the engine is applied to move the car forward.

Another object resides in the provision of means for automatically rendering the second means inoperative.

It is another object of the invention to provide an automatic reverse brake which is automatically released to permit reverse movement when such movement is desired and remains released during such movement even after a shift from reverse to neutral gear is effected.

It is a further object to provide an automatic brake which is automatically released to permit desired reverse movement and remains released during such movement even after a shift to a forward speed is effected.

A further object of the invention is to provide an automatic reverse brake which is automatically released when the vehicle is driven in reverse and maintained thus while the vehicle is moving backward, regardless whether under the influence of the motor, gravity, momentum or otherwise.

An automatic brake, as applied in my invention, will eliminate the necessity of using the foot or hand brakes to hold the car till the engine is clutched to the drive wheels and greatly facilitates starting the car up an incline.

Further objects and advantages will be more fully set forth as the description proceeds.

Figure 2:
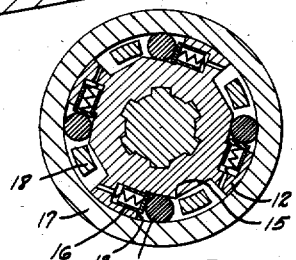
Fig. 2 is a vertical section on the line 2—2 of Fig. 1.

Referring to the drawing by reference numerals, 1 is the stem gear of an automobile transmission and is suitably connected to the engine or source of power, 2 is the counter-shaft drive gear which engages the gear 1 at all times, 3 is a second speed countershaft gear which engages with the second and third sliding gear 4, 5 is a countershaft low speed gear and is slidably splined to the countershaft arranged to mesh with the low speed gear 6 which is splined on the shaft 7 to which is also splined the second speed gear 4. A reverse idler gear 8 is slidably mounted on its shaft (not shown) and meshes with the countershaft reverse gear 9 and the main or propeller shaft reverse gear 10. The shaft 7 is suitably connected to the drive wheels of the vehicle in the customary manner. An automatic over-running brake is shown at 11 and consists of a cam member 12 which is fixed or tightly splined to the propeller shaft 7, and which is provided with cut-away portions 13 more clearly shown in Fig. 2, in each of which is a roller 14. These rollers are adapted to be pressed by springs 16 so as to be urged by these springs away from their positions in the ends of the cut-away portions. These cutaway portions 13 are suitably tapered, the distance between the point 15 of each cut-away portion and the fixed outer shell or race 17 being smaller than the diameter of the rollers. It will be seen, therefore, that the springs and rollers will prevent a clockwise movement of the shaft 7 (see Figure 2) as the rollers will wedge between parts 17 and 12. The arrangement will, however, permit a counter-clockwise rotation of the shaft as there is then no wedge action to lock the parts 12 and 17 together.

Figure 3:
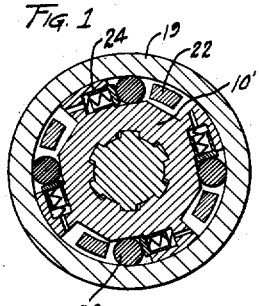
Fig. 3 is a vertical section on the line 3—3 of Fig. 1.

The reverse gear 10 is rigidly connected to a member 10′ which is loosely splined on the shaft 7 as shown in Fig. 3, and the gear 10 is provided with projections or lugs 18 which extend substantially parallel to the gear axis and project into the cutaway portions 13 of the automatic brake arrangement 11 so that each lug is closely adjacent to one of the rollers 14. The looseness of the spline between the part 10′ and the shaft 7 permits a relative movement of the cam member 12 and the part 10′ so that the rollers 14 may be moved clockwise (see Fig. 2) by the lugs 18 against the tension of the springs 16 into the large portions of the cut-away portions 13, where the rollers cannot lock the parts 12 and 17 together.

Figure 4:
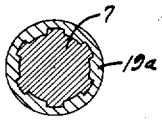
Fig. 4 is a vertical section on the line 4—4 of Fig. 1.
Figure 5:
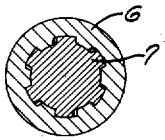
Fig. 5 is a vertical section on the line 5—5 of Fig. 1.

The part 10′ of the gear wheel 10 has similar cut-away portions therein with corresponding rollers and springs in the same manner as the automatic over-running brake 11, and the shell part or race 19 is rigidly connected as shown at 19a in Fig. 4 to the shaft 7. A second automatic over-running brake 20 is thus provided by the shell part 19 and the cam part 10', but it operates in a reverse direction from the over-running brake 11. The gear 6 is provided with arms 21 integrally connected thereto, the ends of which form releasing dogs 22 which may release the rollers 23 of the brake 20 when the gear 6 is rotated counter-clockwise (see Fig. 3) relatively to the automatic brake 20. This rotation is permitted by a loose spline as shown in Fig. 5 between the gear 6 and the shaft 7.

It will be seen that the automatic brake 11 will operate to prevent a reverse rotation of the shaft 7 due to the car drifting backwards since at such times the lugs 18 are not forced against the rollers 14 to prevent them from locking, the lugs 18 merely rotating around freely with the shaft 7 when the car is out of gear or in high, second or low gear.

Figure 6:
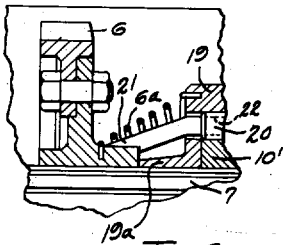
Fig. 6 is a fragmentary view illustrating a detail modification of the invention.

When the car is in reverse gear and the countershaft and reverse idler 8 driving the gear 10 in a clockwise direction, (see Figs. 2 and 3) the lugs 18 fastened to this gear 10 will be forced against the rollers 14 to release them from their wedged position and so release the shaft 7 and permit the car to be driven backwards by the gear 10. The gear 10 and the shaft 7 are operably connected after the rollers 14 are released and the loose play in the spline between the gear 10 and the shaft 7 taken up. As soon as the speed of the engine is decreased by the operator or after the clutch between the engine and the transmission mechanism is released with the car in reverse gear, the gear 10 would not continue to hold the brake 11 released as the lugs 18 would drift away from the rollers 14 and the car would immediately stop with a jerk, and backwards coasting in reverse gear prevented, if it were not for the second brake arrangement 20. This brake 20 functions to lock the reverse gear 10 and its lugs 18 in such a position as to hold the rollers 14 of the brake 11 from wedging. This is accomplished by means of the rollers 23 which prevent any counter-clockwise movement of the gear 10 and its integral part 10' at this time by the wedging action of the rollers 23 between parts 10' and 19, whereby the gear 10 is locked to the shaft 7, the lugs 22 of the gear 6 not exerting any force on the rollers 23 as the gear 6 is free to rotate with the shaft 7. The springs 24 of the clutch 20 will ordinarily be sufficient to prevent any inertia or other effect, as for instance the effect of the dragging of the oil on the gear 6 which might tend to release the rollers 23 at this time, but if desired a spring 6a may be added as illustrated in Fig. 6 to connect gear 6 to the race 19 of the brake 20 so as to normally urge the gear 6, which is loosely splined on shaft 7, in a clockwise direction (see Fig. 3) in relation to the race 19.

Figure 1:
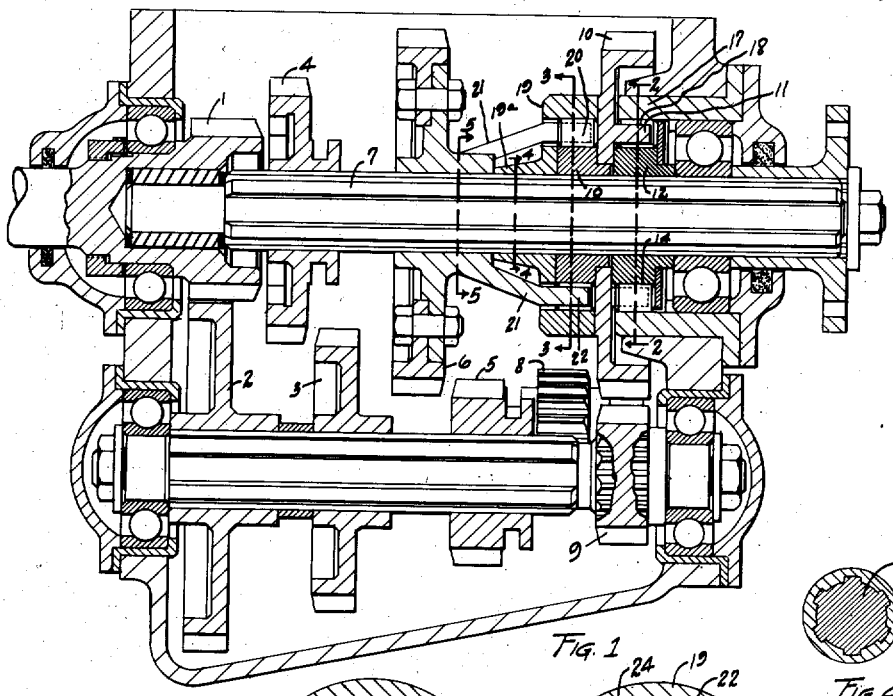
Fig. 1 is a vertical section through a transmission gear box of an automobile showing the adaptation of my invention.

When the car has stopped its backwards coasting in reverse gear, and it is again desired to go forward, the reverse idler gear 8 is disengaged by moving it to its position as shown in Fig. 1, and the gear 5 operated to engage the first speed gear 6. Then when the engine power is applied to the gear 6 it will be rotated counter-clockwise to first release the rollers of the brake 20, thereby immediately releasing the gear 10 and lugs 18 of brake 11 and permitting the rollers 14 to operate to arrest reverse or backward movement of the shaft 7 and thus any backward movement of the car. The gear 6 will then operate to drive the shaft 7 after the loose play in the spline connection of this gear has been taken up.

Although I have shown my invention as applied to a gear box of an automobile I am aware that my invention is capable of adaption in any power transmission system.

It will be seen from the foregoing that this invention provides an automatic reverse brake which is automatically released when the vehicle is driven in reverse and remains released during the continuance of such movement of the vehicle, regardless whether under the influence of the motor, gravity, momentum or otherwise. Thus no damage to the brake or any other part of the vehicle can ensue with this invention since no sudden stop by the brake and accompanying shock can occur. The brake is effective only when the vehicle has ceased moving forward, i. e., when the vehicle is at rest and tends to move backward under some influence other than the motor, such as gravity.

Otherwise stated, the reverse brake is rendered inoperative or locked out when the shaft 7 is power driven in reverse gear, and so remains while the shaft is in reverse gear even after the shaft ceases to be power driven and coasts, and also even when the transmission is thereafter set in neutral, so that the brake cannot suddenly become operative and shock the mechanism and passengers. The brake will remain inoperative and will thereafter be rendered capable of operating, that is, will be unlocked either in response to a power drive of the shaft in forward gear, or in response to a setting of the transmission mechanism in forward gear and a slight rearward movement of the shaft, just sufficient to enable the gear 6 to take up its play on the shaft and cause the fingers 22 to release the parts 10' and consequently the fingers 18 to release the brake rollers 14.

I claim:

1. In a motor vehicle, a change speed transmission for the transmission of power, a shaft rotatable in either direction, a mechanism connected to said shaft to automatically arrest movement of said shaft in one direction, a device for rendering said mechanism inoperative, and means operably connected to a rotatable part of the transmission to be operated thereby to operate the said device for resetting said mechanism when the said shaft is driven by power in the other direction.

2. In a motor vehicle, a change speed gear box for power transmission, a shaft adapted to be driven by a source of power, change speed gearing between said source and shaft, a mechanism connected to said shaft to normally and automatically arrest movement of said shaft in one direction, a device for rendering said mechanism inoperative, and means operably connected to the change speed gearing to be operated thereby to operate the said device for resetting said mechanism when said shaft is driven by the source of power in the other direction.

3. In a change speed gear box of a motor vehicle, including a shaft to be driven by a motor, change speed gearing between said motor and shaft, a mechanism connected to said shaft to normally and automatically arrest movement of said shaft in one direction, and a device for rendering said mechanism inoperative, said device being directly connected to and operated by one of the gears of the change speed gearing when the said gear is driven by the motor.

4. In a change speed gear box of a motor vehicle for power transmission, a driving shaft, a driven shaft, change speed gears on said shafts to interconnect the same, a friction-holding mechanism connected to said driven shaft to normally and automatically arrest rotation of said driven shaft in one direction only, a device for rendering said mechanism inoperative, and a means to operate said device automatically for rendering said mechanism operative when a gear on the driven shaft is driven in the other direction from the driving shaft.

5. In a change speed gear box of a motor vehicle for power transmission, a driving shaft, a driven shaft, change speed gears on said shafts to interconnect the same, a mechanism connected to said driven shaft to normally and automatically arrest rotation of said driven shaft in one direction, a device for readily rendering said mechanism inoperative when under load, and a means to operate said device automatically when a gear on the driven shaft is driven from the driving shaft, together with means for maintaining said mechanism inoperative after the said gear on the driven shaft ceases to be driven from the driving shaft.

6. In a change speed gear box of a motor vehicle for power transmission, a driving shaft, a driven shaft, change speed gears on said shafts to interconnect the same, a mechanism connected to said driven shaft to normally and automatically arrest rotation of said driven shaft in one direction, a device for readily rendering said mechanism inoperative when under load, and a means to operate said device automatically when a gear on the driven shaft is driven from the driving shaft, together with means for maintaining said mechanism inoperative after the said gear on the driven shaft ceases to be driven from the driving shaft, and a mechanism for automatically releasing said last mentioned means when a second gear on the driven shaft is driven from the driving shaft.

7. In a change speed gear box for the transmission of power, a shaft adapted to be rotated in either direction, a mechanism connected to said shaft to automatically arrest movement of said shaft in one direction, a device for rendering said mechanism inoperative, and means operably connected to the transmission gearing to be operated thereby to operate the said device when the said shaft is driven by power in the other direction, said mechanism comprising a member connected to said shaft to rotate therewith, a fixed member, and spring pressed rollers interposed between said members to permit free rotational movements of one of said members in one direction but prevent reverse rotational movements of the same.

8. Transmission mechanism including a shaft, automatic means for preventing movement of said shaft in one direction, means for rendering and maintaining the first means inoperative, a member splined on but capable of limited rotation relative to the shaft, and means operable in response to movement of said member in the opposite direction relative to said shaft for rendering said first means operative.

9. In a change speed gear box for power transmission, including a transmission mechanism having a shaft adapted to be driven by a source of power, change speed gearing between said source and shaft, a mechanism connected to said shaft and operable with practically no lost motion to normally and automatically arrest movement of said shaft in one direction, a device for rendering the last named mechanism inoperative, said device being operably connected to the change speed gearing to be operated thereby when said shaft is driven by the source of power in the same direction.

10. Transmission mechanism of a motor vehicle including a shaft, automatic means for preventing movement of said shaft in one direction, means for rendering and maintaining the first means inoperative, and mechanism operably connected to the transmission mechanism and operated thereby upon movement of a part of the transmission mechanism in the opposite direction for rendering the first means operative.

11. Transmission mechanism of a motor vehicle including a shaft, automatic means having provision for rendering the same instantaneously operative for preventing movement of said shaft in one direction, means for rendering and maintaining the first means inoperative, and mechanism operably connected to the transmission mechanism and operative thereby upon movement of a part of the transmission mechanism in the opposite direction for rendering the first means operative.

12. Transmission mechanism including a shaft, automatic means having provision for rendering the same instantaneously operative for preventing movement of said shaft in one direction, means for rendering and maintaining the first means inoperative, a member splined on but capable of limited rotation relative to the shaft, and means operable in response to movement of said member in the opposite direction relative to said shaft for rendering said first means operative.

13. In a motor vehicle change speed gear box for the transmission of power, including a transmission mechanism having a shaft rotatable in either direction: a friction-holding mechanism connected to said shaft to automatically arrest movement of said shaft in one direction, a device for rendering the last-named mechanism inoperative, and means operably associated with the transmission mechanism to be operated thereby to render said device inoperative when said shaft is driven by power in the other direction.

14. In a motor vehicle change speed gear box for power transmission, including a transmission mechanism having a shaft adapted to be driven by a source of power: change speed gearing between said source and shaft, a mechanism connected to said shaft to normally and automatically arrest movement of said shaft in one direction, a device for rendering the last-named mechanism inoperative, and means operably connected to the change speed gearing to be operated thereby to render said device inoperative when said shaft is driven by the source of power in the other direction.

15. In a change speed gear box for power transmission, including a transmission mechanism having a shaft adapted to be driven by a source of power: change speed gearing between said source and shaft, a mechanism connected to said shaft and operable with practically no lost motion to normally and automatically arrest the movement of said shaft in one direction, a device for rendering the last-named mechanism inoperative, and means operably associated with the change speed gearing to be operated thereby to render said device inoperative when said shaft is driven by the source of power in the other direction.

16. In combination with a change speed gear box for power transmission, including a transmission mechanism having a shaft arranged to be driven by a source of power in each direction: a mechanism connected to said shaft to automatically arrest movement of said shaft in one direction, said mechanism comprising a part rotatable with said shaft, a relatively stationary part, said parts having cooperating relatively inclined surfaces, gripping means carried by the rotatable part and disposed between said surfaces, means urging said gripping means toward said surfaces to engage said surfaces and lock the shaft against undesired rotation in one direction, and a rotary device for holding said gripping means out of gripping engagement with said surfaces when it is desired to rotate the shaft in said one direction, and means operably connected to the transmission mechanism to render said device inoperative when said shaft is driven by power in the opposite direction.

17. In combination with a change speed gear box for power transmission, including a transmission mechanism having a shaft arranged to be driven by a source of power in each direction: a mechanism connected to said shaft to automatically arrest movement of said shaft in one direction, said mechanism comprising a part rotatable with the shaft, a relatively stationary part, said parts having cooperating relatively inclined surfaces, a plurality of gripping rollers between, and means urging said rollers towards said surfaces to engage the same and thereby lock the rotatable part against undesired rotation in one direction, a device including a corresponding plurality of fingers engageable with the respective rollers for moving, and means for holding, said gripping rollers out of gripping engagement with said surfaces when it is desired to rotate the shaft in said one direction, and means operably connected to the transmission mechanism to be operated thereby to render said device inoperative when the shaft is driven by power in the opposite direction, so that said gripping rollers will thereafter be operative when the shaft tends to coast in the first-named direction.

18. Transmission mechanism including a shaft, automatic means for preventing movement of said shaft in one direction, means for rendering and maintaining the first named means inoperative, a member mounted on but capable of limited rotation relative to the shaft, spring-means urging said member to move relative to said shaft in said direction to overcome inertia of and oil drag on said member, and means operable in response to movement of said member in the opposite direction relative to said shaft for rendering said first-means operative.

19. Transmission mechanism including a shaft, automatic means having provision for rendering the same instantaneously operative for preventing movement of said shaft in one direction, means for rendering and maintaining the first means inoperative, a member mounted on but capable of limited rotation relative to the shaft, springs means urging said member to move relative to said shaft in said direction to overcome inertia of and oil drag on said member, and means operable in response to movement of said member in the opposite direction relative to said shaft for rendering said first means operative.

20. In combination with a transmission mechanism including a shaft and means to drive the shaft by power in each direction: an automatically operable brake operatively associated with said shaft to prevent undesired rotation of the shaft in one direction, a device operative automatically in response to exertion of power by said means to drive said shaft in said one direction, to prevent operation of said brake, means automatically operative subsequent to said exertion of power for holding said device in operative position, and means operably connected to the transmission mechanism to be automatically operated thereby to release said device and thereby render the brake operative when the shaft is driven by said first means in the opposite direction.

21. In a change speed gear box of a motor vehicle: a drive shaft, a driven shaft, change speed gears on said shafts to interconnect the same for reverse and forward drive of the driven shaft, a mechanism connected to said driven shaft to normally and automatically arrest reverse rotation of said driven shaft, a device for automatically rendering said mechanism inoperative when the driven shaft is reversely rotated by the driving shaft, means for maintaining said mechanism inoperative after the driving shaft ceases to reversely rotate the driven shaft, and a mechanism connected to the forward drive gear of the driven shaft for automatically releasing said means when said forward drive gear of the driven shaft is driven by a gear on the driving shaft.

22. In a motor vehicle transmission including a shaft and mechanism for establishing forward and reverse drives of the shaft: a one-way brake device for automatically preventing undesired reverse rotation of said shaft, means for rendering and maintaining said device inoperative to enable the shaft to move in the reverse direction, said means being operative even after said transmission mechanism is changed from reverse to a forward condition, and means operably connected to the transmission mechanism to be operated thereby to render said first means inoperative when the shaft is driven by power in the opposite direction.

23. In a motor vehicle transmission mechanism: shiftable means for establishing forward and reverse drives, a shaft, a device for automatically preventing undesired reverse rotation of said shaft, a mechanism for disengaging said device, means for preventing re-engagement of said device while the vehicle is moving rearwardly at any appreciable speed so as to prevent a disagreeable shock to the vehicle and passengers even though the transmission is shifted from reverse to neutral, and means operably connected to a rotatable part of the transmission mechanism to be operated thereby to render said first means inoperative when the shaft is driven by power in the opposite direction.

24. In a motor vehicle transmission including a shaft and mechanism for establishing forward and reverse drives of the shaft: a friction holding one-way brake device for automatically preventing undesired reverse rotation of said shaft, means for rendering said device inoperative, means to prevent the restoration of said device to operativeness under conditions that would cause objectionable shock to the mechanism, and means operably connected to the transmission mechanism to be operated thereby to render said first means inoperative when the shaft is driven by power in the opposite direction.

25. In a motor vehicle transmission, a shaft arranged to be stationary or to be rotated in a selected direction, automatic mechanism operative to prevent rotation of said shaft in a reverse direction only, and a unitary device operable for driving said shaft in said reverse direction and rendering said mechanism inoperative.

26. In a motor vehicle transmission, a shaft arranged to be stationary or to be rotated in forward and reverse directions, mechanism automatically operative when said shaft is stationary to prevent undesired reverse rotation of said shaft, a device for rendering said mechanism inoperative when it is desired to drive said shaft in the reverse direction, and means for thereafter rendering said device inoperative by driving said shaft in the forward direction.

27. In a motor vehicle transmission, a shaft, automatic mechanism for preventing movement of said shaft in one direction, means for rendering and maintaining said mechanism inoperative, and means operable for rendering said mechanism operative by rotation of a part of said transmission in the opposite direction.

28. In a motor vehicle, a change speed gear box for power transmission including a member operatively associated with the road wheels of the vehicle and arranged to be stationary or to be rotated in forward and reverse directions, mechanism normally and automatically operative with no lost motion to prevent undesired reverse rotation of said member, a device for rendering said mechanism inoperative when it is desired to rotate said member in reverse, and means for maintaining said mechanism inoperative even though the change speed gear box is restored to neutral when the vehicle is moving backwardly.

29. In a motor vehicle, a change speed gear box for power transmission including a member arranged to be stationary or to be rotated in forward and reverse directions and operatively associated with the road wheels of the vehicle, friction mechanism normally and automatically operative to prevent undesired reverse rotation thereof, a device for rendering said mechanism inoperative when the same is under load to permit backward movement of said vehicle, and automatic means for maintaining said mechanism inoperative even though said change speed gear box is restored to neutral when the vehicle is moving backwardly.

30. In a motor vehicle, a change speed gear box for power transmission including a member arranged to be stationary or to be rotated in forward and reverse directions and operatively associated with the road wheels of the vehicle, mechanism normally and automatically operative to prevent only undesired reverse rotation of said member, a device for rendering said mechanism inoperative when it is desired to rotate said member in the reverse direction, and means for maintaining said mechanism inoperative even though said gear box is arranged for forwardly rotating said member when said vehicle is moving backwardly.

31. In a motor vehicle, a change speed gear box for the transmission of power including a shaft operatively associated with the road wheels of the vehicle, shift means whereby said gear box may be set for driving said vehicle in a selected direction, a mechanism automatically operable for holding said shaft to prevent movement of said vehicle in the opposite direction, said mechanism including a plurality of relatively movable members, one of which is rotatable with said shaft and one of which is adapted to prevent relative rotation in one direction between the other of said relatively movable members upon tendency of said vehicle to move in said opposite direction, one of said members being movable in said opposite direction from its normal operative position to render said mechanism inoperative for permitting movement of said vehicle in said opposite direction, said last mentioned member being adapted to be restored to normal operative position for rendering said mechanism operative when said shaft is driven in said selected direction.

32. In a motor vehicle transmission having a member adapted to be driven by a source of power, a mechanism connected to said member to normally and automatically arrest movement of said member in one direction, a device operable for rendering said mechanism inoperative to permit movement of said member in said direction, and means for rendering said device inoperable thereby to reset said mechanism by rotation of said member in the other direction.

33. In a motor vehicle, a change speed gear box for the transmission of power having a shaft arranged to be stationary or to be rotated in either direction and operatively connected to the road wheels of the vehicle, automatic friction holding mechanism associated with said shaft for preventing movement of said shaft in one direction, said mechanism being automatically rendered inoperative when said shaft is driven in said last named direction, and automatic means for maintaining said mechanism inoperative when said gear box is restored to neutral.

34. In a motor vehicle transmission, a shaft arranged to be stationary or to be rotated in either direction and operatively associated with the road wheels of the vehicle, a self-operating mechanism associated with said shaft and operative for preventing rotation of said shaft in one direction, a device operable for readily rendering said mechanism inoperative when the same is under load to permit movement of said vehicle in said direction, and means for rendering said device inoperative upon rotation of a part of said transmission in the other direction.

35. In a motor vehicle transmission, a shaft arranged to be stationary or to be rotated in forward and reverse directions, mechanism automatically operative to prevent undesired reverse rotation of said shaft, said mechanism being adapted to be rendered inoperative by rotation of a part thereof in said reverse direction to permit the shaft to be rotated in a reverse direction, and means for thereafter rendering said device inoperative when said shaft is rotated in a forward direction.

36. In a motor vehicle, a change speed gear box for the transmission of power including a shaft operatively associated with the road wheels of the vehicle, shift means whereby said gear box may be set for driving said vehicle in a selected direction, a mechanism automatically operable for holding said shaft to prevent movement of said vehicle in the opposite direction, said mechanism including means to cause automatic operation thereof, a device for rendering and maintaining said mechanism inoperative, and means operably connected to the change speed gearing and operated thereby upon rotation of a part of same in the opposite direction for rendering said mechanism operative.

37. In a motor vehicle transmission, a shaft arranged to be stationary or to be rotated in forward and reverse directions, shiftable means for establishing forward and reverse drives of said shaft, an automatic mechanism normally operable for preventing undesired reverse rotation of said shaft, a device for disengaging said mechanism, and automatic means for preventing reengagement of said mechanism while the vehicle is moving rearwardly at any appreciable speed so as to prevent objectionable shock to said mechanism even though the transmission is shifted to a forward gear.

38. In a motor vehicle, a transmission including a shaft arranged to be stationary or to be rotated forwardly and reversely and operatively associated with the road wheels of the vehicle, shiftable means for establishing forward and reverse drives of said shaft, a mechanism for automatically preventing only undesired reverse rotation of said shaft, a device operable without moving the road wheels of the vehicle in a forward direction for disengaging said mechanism when the same is holding said shaft against rotation, and means for maintaining said device operative even though said transmission is restored to neutral.

39. In a motor vehicle transmission, a shaft operatively associated with the road wheels of the vehicle, and arranged to be stationary or to be rotated in forward and reverse directions, shiftable means for establishing forward and reverse drives, an automatic friction-holding mechanism for preventing undesired reverse rotation of said shaft, a device for rendering said mechanism inoperative, and positive means for rendering said device inoperable when said shaft is driven in a forward direction.

40. In a motor vehicle transmission, a shaft operatively associated with the road wheels of the vehicle and arranged to be stationary or to be rotated in forward or reverse directions, shiftable means for establishing forward and reverse drives, an automatic mechanism for preventing undesired reverse rotation of said shaft, a device for rendering said mechanism inoperative, and means for preventing reengagement of said mechanism under conditions that would cause objectionable shock to said mechanism, and means for rendering said device inoperative upon rotation of a part of said transmission in the other direction.

41. In a motor vehicle transmission, a shaft operatively associated with the road wheels of said vehicle, shift means whereby said transmission may be set for driving said vehicle in a selected direction, a mechanism operatively associated with said shaft and normally operable for automatically holding said shaft to prevent movement of said vehicle in the opposite direction, and a power driven element for rendering said mechanism inoperative to permit movement of said vehicle in said opposite direction.

42. In a motor vehicle transmission, a shaft adapted to be motor driven in both directions and operatively associated with the road wheels of the vehicle, shift means whereby said transmission may be set for driving said vehicle in a selected direction, a mechanism operatively associated with said shaft and normally operable for automatically holding said shaft to prevent movement of said vehicle in the opposite direction, said mechanism including a plurality of relatively movable members, one of which is rotatable with said shaft, and a frictionally operable gripping member adapted to couple said relatively movable members upon tendency of said vehicle to move in said opposite direction, one of said members being movable in said opposite direction to prevent gripping action between said members.

43. A transmission for a motor driven vehicle including a shaft adapted to be motor driven in both directions and operatively associated with the road wheels of the vehicle, shift means whereby said transmission may be set for neutral and for driving said vehicle in a selected direction, an automatic mechanism normally operable for holding said shaft to prevent movement of said vehicle in the opposite direction when said shift means is set for neutral and for driving said vehicle in said selected direction, said mechanism including a plurality of relatively movable members having relatively inclined locking surfaces, one of which members being rotatable with said shaft, a locking roller adapted to be wedged between said surfaces upon tendency of said vehicle to move in said opposite direction, means engageable with said roller for moving the same relative to the locking surfaces of said members for rendering said mechanism inoperative when it is desired to drive said vehicle in said opposite direction, and means for maintaining said mechanism inoperative even though said shift means is set for driving said vehicle in said selected direction.

44. A transmission for a motor driven vehicle including shift means whereby said transmission may be set for neutral and for driving said vehicle in a selected direction, a mechanism normally operable for automatically locking said vehicle against movement in the opposite direction, said mechanism including a plurality of relatively movable members, one of which is adapted to be motor driven in both directions and is operatively associated with the road wheels of the vehicle, a frictionally operable gripping member adapted to couple said relatively movable members to prevent relative rotation therebetween in one direction, means including a movable lug cooperable with one of said members for rendering said mechanism inoperable when it is desired to drive said vehicle in said opposite direction, and means for maintaining said mechanism inoperable even though said shift means is set for neutral.

45. In a motor vehicle transmission including change speed gearing, a member operatively associated with the road wheels of the vehicle, a mechanism normally and automatically operable for preventing rotation of said member in one direction, and a device movable in response to rotation of a part of the transmission for rendering said mechanism inoperable.

46. In a motor vehicle transmission including change speed gearing, a member operatively associated with the road wheels of the vehicle, a mechanism normally and automatically operable for preventing rotation of said member in one direction, and a device rotatable in the same direction for rendering said mechanism inoperable, said mechanism remaining inoperable until a part of said transmission is rotated in the opposite direction.

47. In a motor vehicle transmission having a reverse gear, shiftable means for rendering said gear operable and inoperable, a member operatively associated with the road wheels of the vehicle, a mechanism normally and automatically operable for preventing movement of said member in one direction, said mechanism being capable of being rendered inoperative by said reverse gear upon movement thereof and means for maintaining said mechanism inoperative even though the reverse gear is rendered inoperative.

48. In a motor vehicle transmission having a neutral position, a member operatively associated with the road wheels of the vehicle, a mechanism normally and automatically operable for preventing movement of said member in one direction, said transmission and said mechanism being adapted to be in a neutral position at the same time, and means for resetting said mechanism upon forward rotation of a part of said transmission.

49. In a motor vehicle transmission, a shaft, frictionally operable mechanism for automatically preventing movement of said shaft in one direction, means for rendering and maintaining said mechanism inoperative, and means operable for rendering said mechanism operative by rotation of a part of said transmission in the other direction.

CARL F. RAUEN.